United States Patent Office 3,403,121
Patented Sept. 24, 1968

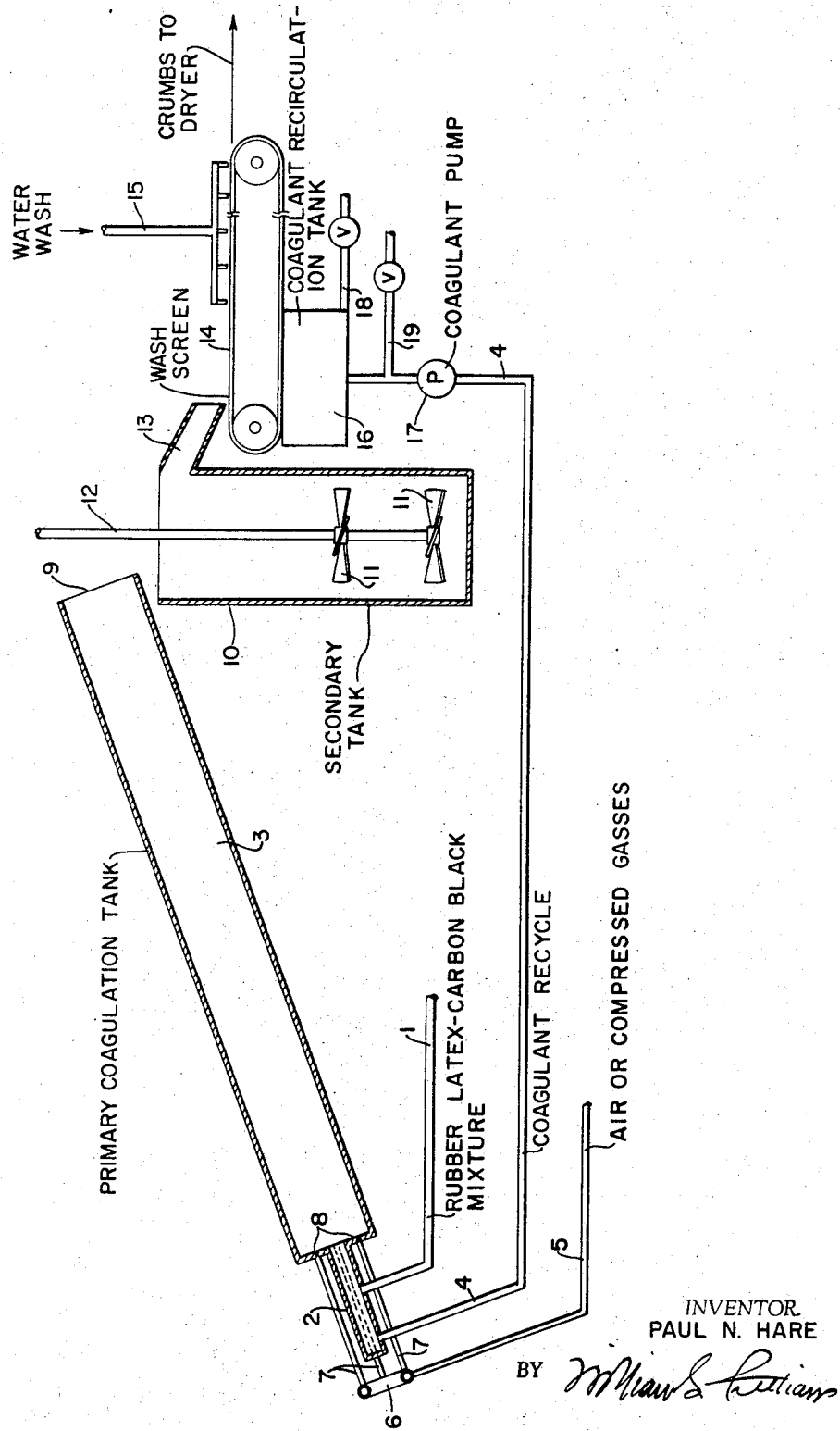

3,403,121
METHOD FOR COMPOUNDING RUBBERS WITH CARBON BLACK
Paul Nelson Hare, Swartz, La., assignor to Columbian Carbon Company, New York, N.Y., a corporation of Delaware
Filed July 17, 1964, Ser. No. 383,290
11 Claims. (Cl. 260—33.6)

ABSTRACT OF THE DISCLOSURE

A carbon black-rubber masterbatch is produced by injecting a mixture of an aqueous acidic coagulation medium and an aqueous mixture of carbon black and rubber latex into the lower end of an elongated coagulation chamber containing a body of coagulating medium. A non-reactive gas is introduced into the lower end of the chamber from a plurality of points spaced substantially symetrically about the point at which the mixture is introduced into the coagulation chamber. The rubber latex is characterized by a density of at least about 1.2 grams per cubic centimeter at 25° C. The chamber is inclined at an angle of 10°–45°.

---

Carbon black is widely used as a re-enforcing agent in rubber. For many years, practically all carbon black-rubber compounding was accomplished by dry mixing techniques. These techniques left much to be desired in processing and finished product quality. More recently, processes have been developed and used extensively on a commercial scale wherein an aqueous dispersion of carbon black is mixed with the rubber in latex form after which the rubber is coagulated to produce a coagulum of rubber containing the carbon black uniformly dispersed therein.

In these so-called "latex masterbatching" processes, is has heretofore been general practice to agglutinate the rubber with the carbon black by introducing the carbon black-latex mixture, hereinafter called "carbex," into a large, vertically elongated primary coagulation tank containing an acidic coagulating liquid that is subjected to mechanical agitation. This mechanical agitation creates a turbulence sufficient to shatter the carbex into droplets. Upon coagulation, therefore, the carbon black-rubber masterbatch coagulum forms as crumbs or friable aggregates. Since the coagulum is particulate in form and has a specific gravity of less than that of the liquid coagulating medium, it is easily suspended within the coagulating medium and tends to float to the surface thereof.

The coagulum may be removed continuously from the primary coagulation tank by continuously and purposely overfilling the tank during operation so that the coagulating liquid containing suspended crumb particles flows out through a spout near the top of the tank. This suspension is frequently charged to a secondary tank for additional contacting of the coagulum crumbs with the coagulating liquid. The coagulating liquid carrying the crumbs overflows from the secondary tank unto a washing stream medium and washed and dried.

Most rubbers available in latex form have been satisfactorily coagulated with carbon blacks in accordance with this prior art method. If the rubber exhibits unusual tackiness during coagulation, however, the partially coagulated crumbs formed from the carbon black-rubber masterbatch often coalesce to form large aggregates that cannot be easily broken up or separated from the coagulating liquid. Likewise, the partially coagulated crumbs tends to adhere to the mechanical agitation members to form large deposits that impair or disrupt the mechanical operation for shattering the carbex into droplets.

The prior art operation is also impaired when the density of the rubber is so high that the masterbatch coagulum will not readily suspend in the coagulating medium. In this case, the coagulum settles to the bottom of the tank so that it cannot be removed by overflowing the tank as indicated above.

In particular, the prior art coagulation method has not been satisfactory for neoprene rubbers, which have a higher density than most rubbers and exhibit unusual tackiness during coagulation.

Therefore, it is an object of the present invention to provide a method for compounding rubbers with carbon black that is economical and continuous in operation.

It is another object of this invention to provide an improved method for coagulating a carbon black-rubber carbex prepared from a rubber exhibiting unusual tackiness during coagulation.

It is another object of this invention to provide an improved method for coagulating a carbon black-rubber carbex that forms a coagulum having a density greater than that of the liquid coagulating medium.

It is a further object of the present invention to provide a method for coagulating carbon black-neoprene masterbatches.

With these and other objects in view, an embodiment of the present invention is hereinafter described with reference to the accompanying drawing, which is a flow diagram of the described embodiment.

The objects of this invention are accomplished by introducing the carbex into the lower end of an elongated, inclined coagulation tank containing a body of aqueous acidic coagulating medium and mixing the carbex with the coagulating medium under turbulent conditions, but in the absence of mechanical agitation, to coagulate the rubber latex and agglutinate the carbon black with the rubber. The contents of the tank are maintained in a state of sufficient turbulence to suspend the resultant masterbatch crumb particles in the coagulating medium and to avoid excessive coalescence of the crumb particles. The suspension of crumbs in the coagulating medium is continuously overflowed from the upper end of the inclined tank.

While the present invention may be employed in the compounding of any carbon black-latex mixture, it is particularly well suited for the compounding of those rubbers for which the prior art methods have not been satisfactory. That is, the present invention may be employed for rubbers that exhibit unusual tackiness during coagulation and which have a density greater than that of the liquid coagulating medium. Preferably, the present invention may be employed with rubbers having a density at 25° C. of at least about 1.2 grams per cubic centimeter.

The present invention is particularly suited to the coagulation of mixtures of carbon black and neoprene rubber latices. The term "neoprene rubber," as understood in the industry and as used herein, is a generic term denoting synthetic rubber-like homopolymers of 2-chloro-1,3-butadiene (chloroprene) and copolymers of a major proportion of chloroprene with a minor proportion of dienes or vinyl compounds, such as acrylonitrile, butadiene, isoprene, styrene and 2,3-dichloro-1,3-butadiene. A more complete description of neoprene rubbers and the processes for manufacturing them may be found in the various patent and literature references on the subject, e.g. the next entitled, "Synthetic Rubber" by G. S. Whitby, 1954 edition, published by John Wiley and Sons, Inc., pp. 767–793.

In accordance with the present invention, the neoprene carbex is continuously introduced substantially axially into the lower end of an inclined primary coagulation tank, elongated in the direction of incline, and is mixed with a body of coagulating medium contained therein under conditions of high turbulence to affect coagulation.

If a vertically elongated coagulation tank were to be employed in the coagulating of a neoprene carbex, it would be necessary to provide a very high, narrow tank due to the high density of the neoprene rubber. This arrangement has not proved effective. For this reason, the coagulation tank is advantageously inclined with respect to the horizontal at an angle less than about 45°, preferably between about 10° to about 30°.

The turbulence necessary for mixing the neoprene carbex with the coagulating medium in the primary coagulation tank and suspending the resultant masterbatch crumb particles in the coagulating medium is advantageously effected, in accordance with present invention, by injecting a non-reactive gas, such as air, under pressure into the lower end of the tank. Desirably, the non-reactive compressed gas is introduced into the bottom of the tank from a plurality of points spaced symmetrically about the point at which the carbex is discharged into the tank.

In addition to assisting in the mixing of carbex and the coagulating medium in the lower end of the coagulation tank and the suspension of the resultant crumb particles in the coagulating medium, the non-reactive gas becomes occluded within the crumb to produce sponge-like particles having greater buoyancy, and hence a lower than normal density. The non-reactive gas also curtails coalescence of the particles by enveloping or adhering to them as bubbles.

Following coagulation in the primary coagulation tank, the masterbatch crumb particles, along with a portion of the coagulating medium, may be charged to a second coagulation tank which may be vertically elongated wherein the mixture is subjected to severe mechanical agitation to finish out coagulation and to facilitate separation of the crumb particles from the coagulating medium. Thereafter, the crumbs are separated from the liquid coagulating medium and are washed and dried according to standard practices.

Advantageously, at least a portion of the liquid coagulating medium separated from the masterbatch crumbs is returned to the primary coagulation tank and reused. Preferably, the recycled coagulating liquid is intimately mixed with the carbex stream by bringing the two streams together at high velocities immediately prior to charging these streams to the primary coagulation chamber. This practice has been found to result in the formation of crumb particles of substantially uniform particle size.

The size arrangement of the primary coagulation tank and other operating conditions, such as the rate at which the mixture of carbex and recycled coagulating liquid is charged to the tank and the pressure at which the compressed gas is introduced, should be adjusted to provide at least a few seconds of contact time between the crumbs and the coagulating medium before the suspension is overflowed into the secondary tank for additional contacting with the coagulating medium and for reducing of any exceedingly large agglomerates of the coagulated particles to crumbs of a smaller size. The total contact time required for thorough coagulating will vary with temperature and other factors, but is usually within the range of from about 30 seconds to 5 minutes.

Although a number of conventional acidic coagulating agents may be employed in accordance with the present invention, aqueous solutions of aluminum sulfate are particularly suitable for use in the coagulation of neoprene latex. More particularly, it is preferred to use aqueous solutions of the octadecahydrate form of aluminum sulfate, i.e. $Al_2(SO_4) \cdot 18H_2O$, at concentrations of from about 1% to 5% by weight, and more advantageously, at 4–5% by weight. Whenever practical and economical, however, higher concentrations may be used since this results in the density of the coagulating medium being increased to more nearly approximate the true density of of the masterbatch crumb, thereby facilitating suspension and removal of the crumb from the tank.

Although the temperature at which the coagulating medium is maintained is subject to considerable variation the optimum temperature range is between about 70° to about 190° F.

The invention will now be further described with reference to the drawing which illustrates one satisfactory embodiment of the operation. It will be understood, however, that the invention is not limited thereto since other embodiments will be apparent to those skilled in the art with the scope of the present invention.

The liquid carbex mixture is charged at high velocity through the line designated by the numeral 1 into mixing conduit 2. This mixing conduit discharges coaxially into the lower end of an elongated, inclined cylindrical coagulation tank 3 filled with acidic liquid coagulating medium. As previously indicated, the coagulation tank 3 is advantageously inclined with respect to the horizontal at an angle less than about 45°.

Simultaneously recycled coagulating medium separated from the finished masterbatch crumb is continuously introduced into the mixing conduit 2 through line 4 at a velocity sufficient to shatter the carbex stream into droplets by turbulence and impact within the conduit 2, so that the two streams are thoroughly mixed before entering the coagulation tank 3. Note in the drawing that the coagulation medium moves longitudinally through conduit 2 while the carbex is introduced perpendicularly into the conduit, thus creating a condition of high shear which shatters the carbex into droplets at the juncture of the streams.

To effect complete mixing between the carbex and the coagulating medium in coagulation tank 3, the contents are turbulently agitated by introducing a non-reactive gas under pressure into the bottom of the tank. The compressed gas may be introduced by means of a supply conduit 5 leading into manifold 6, which in turn supplies a plurality of feed conduits 7 terminating in small discharge orifices 8. Advantageously, a total of from 3 to 8 of these feed conduits 7 are employed, said feed conduits being arranged symmetrically about mixing conduit 2.

The resultant masterbatch crumb particles are caused to remain suspended within the coagulating medium by controlling the pressure under which the gas is introduced into the tank, the rate at which the carbex and recycled coagulation liquid are introduced, the density and temperature of the coagulating medium and the angle of inclination of the coagulation tank, as previously noted.

Advantageously, conditions should be adjusted so that the mixture is not transferred from tank 3 until primary coagulation is completed, i.e. coalescence of the crumb particles has substantially terminated. Masterbatch crumb and coagulating medium overflowing from tank 3 pass into secondary tank 10 where they are subjected to severe mechanical agitation to finish out coagulation and thereby toughen the crumb.

Tank 10, which may be vertically elongated as shown, is equipped with propellers 11 that are rotated at high speed by means of rotatable drive shaft 12 to violently agitate the mixture. If desired, the propeller blades 11 may be equipped with teeth or claws to break up any exceedingly large agglomerates of the crumb. The rotational speed of propellers 11 should create sufficient turbulence to suspend the crumb in the coagulation medium and permit removal of the crumb from the tank in that condition as overflow through spout 13. With vertical tanks having a length-to-diameter ratio within the range of from about 1 to about 3, the rotational speed required to achieve optimum turbulence is usuallly within the range of about 500 to 1,000 r.p.m. when high efficiency marine propellers are used.

Masterbatch crumb and coagulating liquid overflowing from tank 10 through spout 13 fall onto a separating and washing screen 14 of the continuous type. The separated crumb is carried by moving screen 14 beneath a water spray arrangement 15 for washing and is then conveyed to conventional drying apparatus, not shown.

The coagulating liquid separated from the crumb is collected in the coagulant recirculation tank 16 from which it is returned through line 4 to mixing conduit 2 by means of pump 17. Coagulating liquid in excess of that recirculated to mixing conduit 2 may be withdrawn from tank 16 by valved connection 18. In order to maintain the coagulating liquid at the desired level of concentration or acidity, fresh coagulating agent may be added to the recirculated coagulating medium stream in line 4 by means of valved connection 19. An advantage of the present invention is that it may be used to coagulate neoprene masterbatches containing relatively large amounts of carbon black and extended oil. The neoprene latex-carbon black mixture, which may contain an emulsified oil, may be formed by any of several well-known methods, e.g. that described in U.S. Patent 2,769,795, issued Nov. 6, 1956 to H. A. Braendle. The amount of carbon black that may be agglutinated with the neoprene rubber may be as high as 200% or higher, by weight of the coagulated neoprene rubber, although the preferred range for most purposes is from about 40% to about 100% by weight of the rubber. In addition to the carbon black, the masterbatch may also contain a processing oil in an amount as high as 50% by weight of the rubber. Several methods are known for emulsifying oil for compounding with latex and need not be described herein.

The invention will now be described in reference to the following specific examples which are included solely for illustrative purposes, and are not to be construed as limiting the invention.

Example I

A neoprene "type W" latex, manufactured and supplied by E. I. du Pont de Nemours and Co., Inc., and having a solids content of about 40% by weight, was mixed at the rate of 364 lbs./hr. with an emulsified, highly aromatic rubber processing oil supplied at a rate of 14.5 lbs./hr. and with an aqueous slurry of 6% by weight carbon black supplied at the rate of 1,050 lbs./hr. These constituents were mixed under conditions of high hydraulic turbulence and impact using high shear dispersing apparatus well-known in the art. No dispersing agents were included in the mixture.

Using the apparatus shown and previously described in reference to the accompanying drawing, the neoprene latex-black-oil mixture was charged immediately after formation and without preliminary creaming, to a mixing conduit wherein it was thoroughly mixed with an aqueous solution of 4% by weight $Al_2(SO_4)_3 \cdot 18H_2O$ before charging to the primary coagulation tank filled with aqueous $Al_2(SO_4)_3 \cdot 18H_2O$ solution. The aqueous $Al_2(SO_4)_3 \cdot 18H_2O$ solution was charged to the mixing conduit at a rate of about 2,700 gallons per hour, said aqueous solution being recycled from the neoprene crumb-coagulating liquid separation step. The temperature of the coagulating liquid was maintained at about 120° F.

The mixing conduit was a 14 inch length of unobstructed pipe having an inside diameter of 1.38 inches. Recycled coagulant was supplied axially into the conduit from the outer end thereof. The carbex was injected perpendicularly into the mixing conduit through a pipe having an inside diameter of 0.622 inch. The point of entry of the carbex stream into the mixing conduit was 1.5 inches downstream from the point of entry for the recycled coagulant.

The primary coagulation tank into which the mixture of carbex and coagulant was axially discharged was a cylinderical conduit having an internal diameter of about 8 inches and a length of about 10 feet. The conduit was inclined from the horizontal at an angle of about 20°.

Air under a pressure of about 100 p.s.i.g. was introduced into the bottom of the inclined primary coagulation tank from six 1/8" orifices spaced symmetrically around the discharge outlet of the mixing conduit.

Coagulation of the neoprene latex occurred within the primary coagulation tank to form sponge-like crumbs of the rubber containing essentially all of the oil and carbon black introduced in admixture with the latex. The crumb particles, which suspended in the coagulating liquid, were continuously conveyed out of the tank with the coagulating liquid at a relatively constant rate into a secondary tank.

The secondary tank employed was vertically elongated and had a diameter of 2.5 feet and a depth of 3 feet. The contents of the tank were agitated by means of a marine propeller operating at about 675 r.p.m. to complete coagulation and break-up of any exceedingly large crumb aggregates into a smaller and more uniform particle size. The crumb was washed and dried and the coagulation liquid separated therefrom was recycled to the mixing conduit at a rate noted above after adjusting the $Al_2(SO_4)_3 \cdot 18H_2O$ concentration thereof to the desired 4% level.

The resulting dried masterbatch crumb was of excellent quality and was found to contain 43.3 parts of carbon black and 10 parts of aromatic oil per 100 parts of neoprene rubber by weight. For the purpose of evaluating its vulcanized properties, a portion of the masterbatch was formulated by conventional mixing techniques with rubber compounding ingredients and cured at 300° F. The compounding recipe, curing conditions and physical properties of the stock are set forth in the following table.

TABLE

| Recipe: | Parts by weight |
|---|---|
| Masterbatch | 153.8 |
| Neozone A [1] | 2.0 |
| Stearic acid | 0.5 |
| Maglite D [1] | 4.0 |
| Zinc oxide | 5.0 |
| Thionex [1] | 0.5 |
| Di-o-polyguanidine | 0.5 |
| Sulfur | 1.0 |

[1] The composition, chemical name, function and manufacture are given in the 1963 Rubber Red Book, p. 497, published by Rubber Age, New York.

RUBBER PROPERTIES

| Cure at 300° F. (minutes) | Modulus L-300 (p.s.i.) | Tensile (p.s.i.) | Elongation (percent) | Shore hardness |
|---|---|---|---|---|
| 10 | 890 | 2,015 | 730 | 53 |
| 20 | 1,450 | 3,120 | 625 | 59 |
| 30 | 1,640 | 3,475 | 580 | 62 |
| 45 | 1,940 | 3,725 | 525 | 63 |
| 60 | 2,015 | 3,820 | 505 | 65 |

Besides having excellent physical properties, the masterbatch processed very favorably during the compounding operation.

As previously noted, the present invention may be used to advantage in the coagulation of black neoprene latices extended with relatively high amounts of oil. The following example is illustrative:

Example II

The coagulation procedure of Example I was repeated on a latex masterbatch formed by mixing 1490 lbs./hr. of a 6% by weight dispersant-free aqueous carbon black slurry and 45.7 lbs./hr. of the processing oil with 364 lbs./hr. of the neoprene latex (40% by weight solids).

A very excellent quality crumb was obtained that was found to contain approximately 61.5 parts of carbon black and 31.5 parts of oil per 100 parts by weight of neoprene rubber.

Example III

In this illustration, a neoprene latex masterbatch formed by mixing 2135 lbs./hr. of a 6% by weight aqueous slurry of carbon black and 29 lbs./hr. of the processing oil with 364 lbs./hr. of the neoprene latex (40% solids by weight), was coagulated following the procedure of Example I, except that the primary coagulation tank was inclined with respect to the horizontal at an angle of about 30°.

The coagulation proceeded smoothly and the resultant crumb was of excellent quality. The crumb was found to contain approximately 88 parts of carbon black and 20 parts of oil per 100 parts by weight of neoprene rubber.

It will be understood that various changes in the details herein described and illustrated in order to explain the nature of the invention may be made by those skilled in the art within the principle and scope of the invention as expressed in the appended claims.

Therefore, I claim:

1. A method of coagulating a carbex of carbon black and a rubber latex, said rubber being characterized by a density of at least about 1.2 grams per cubic centimeter at 25° C. comprising:
    (a) thoroughly mixing the carbex with an aqueous acidic coagulation medium in a preliminary mixing zone with sufficient turbulence to shatter the carbex into droplets;
    (b) immediately injecting the resultant mixture of carbex and coagulation medium, prior to substantial coagulation of the latex in said mixing zone, axially into the lower end of an elongated, inclined coagulation tank containing a body of the coagulating medium, said tank being inclined from the horizontal at an angle of from about 10° to about 45°;
    (c) injection a non-reactive gas into the lower end of the body of coagulating medium from a plurality of points spaced substantially symmetrically about the point at which the carbex is introduced into the tank so as to agitate the carbex within the tank under turbulent conditions, but in the absence of mechanical agitation, during the coagulation of the latex to form carbon-containing rubber crumbs suspended in the coagulating medium;
    (d) removing the resultant suspension of rubber crumb in coagulation medium from the upper end of said coagulation tank; and
    (e) subsequently separating, washing and drying said crumb to obtain a finished carbon black-rubber masterbatch.

2. The process of claim 1 in which streams of carbex and coagulating medium are brought together at high velocities in order to form said carbex-coagulant mixture prior to introduction into the coagulation tank.

3. The method of claim 1 and including the passing of the suspension of rubber crumb in coagulation medium into a second body of aqueous acidic coagulation medium and therein subjecting the suspension to vigorous mechanical agitation prior to separation of the rubber crumb from the coagulation medium.

4. The method of claim 1 in which the aqueous acidic coagulation medium in the coagulating tank is maintained at a temperature of from about 70° F. to about 190° F.

5. The method of claim 1 and including the recycling of aqueous acidic coagulation medium separated from the rubber crumb for mixture with additional carbex prior to coagulation thereof within the coagulation tank.

6. The method of claim 1 in which the rubber is neoprene rubber.

7. The method of claim 1 in which the carbex includes an emulsified rubber processing oil that agglutinates with the rubber upon coagulation.

8. The method of claim 1 in which the coagulation tank is inclined at an angle of from about 10° to about 30° with respect to the horizontal.

9. The method of claim 6 in which the aqueous acidic coagulating medium comprises an aqueous solution of aluminum sulfate.

10. The method of claim 9 in which the aluminum sulfate is in its octadecahydrate form and is present in the aqueous solution at a concentration of from about 4% to 5% by weight.

11. The method of claim 5 and including the addition of fresh coagulating medium to the recirculated coagulating medium stream prior to mixing with said carbex.

References Cited

UNITED STATES PATENTS

| | | | |
|---|---|---|---|
| 2,980,639 | 4/1961 | Braendle | 260—33.6 |
| 2,915,489 | 12/1959 | White | 260—33.6 |
| 3,108,982 | 10/1963 | Barclay | 260—41.5 |
| 3,202,624 | 8/1964 | Gelbert | 260—29.7 |

MORRIS LIEBMAN, *Primary Examiner.*

J. E. CALLAGHAN, *Assistant Examiner.*